United States Patent
Haines et al.

(10) Patent No.: US 8,443,165 B2
(45) Date of Patent: *May 14, 2013

(54) DATA MANAGEMENT IN A DATA STORAGE SYSTEM

(75) Inventors: Jonathan Williams Haines, Boulder, CO (US); Brett Alan Cook, Westminster, CO (US); Timothy Richard Feldman, Louisville, CO (US); Paul Michael Wiggins, Longmont, CO (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/466,397

(22) Filed: May 8, 2012

(65) Prior Publication Data

US 2012/0221826 A1    Aug. 30, 2012

Related U.S. Application Data

(63) Continuation of application No. 12/573,635, filed on Oct. 5, 2009, now Pat. No. 8,195,909.

(51) Int. Cl.
*G06F 12/00* (2006.01)
*G06F 9/46* (2006.01)

(52) U.S. Cl.
USPC ............... 711/170; 711/154; 711/E12.001; 718/102; 718/103; 718/104

(58) Field of Classification Search ............ 711/154, 711/170, E12.001; 718/102, 103, 104
See application file for complete search history.

(56) References Cited

U.S. PATENT DOCUMENTS

| | | | |
|---|---|---|---|
| 5,943,501 | A | 8/1999 | Burger et al. |
| 6,061,776 | A | 5/2000 | Burger et al. |
| 6,073,209 | A | 6/2000 | Bergsten |
| 6,161,170 | A | 12/2000 | Burger et al. |
| 6,792,436 | B1 | 9/2004 | Zhu et al. |
| 7,346,734 | B2 | 3/2008 | Chen et al. |
| 2003/0117877 | A1 | 6/2003 | Roohparvar |
| 2004/0148484 | A1 | 7/2004 | Watanabe et al. |
| 2005/0135180 | A1 | 6/2005 | Roohparvar |
| 2006/0221720 | A1 | 10/2006 | Reuter |
| 2008/0091867 | A1 | 4/2008 | Plondke et al. |
| 2009/0019218 | A1 | 1/2009 | Sinclair et al. |
| 2009/0037652 | A1 | 2/2009 | Yu et al. |
| 2009/0063824 | A1 | 3/2009 | Leaback et al. |
| 2009/0070554 | A1 | 3/2009 | Wang et al. |
| 2009/0094411 | A1 | 4/2009 | Que |
| 2010/0293328 | A1 | 11/2010 | Kishi |
| 2010/0333098 | A1* | 12/2010 | Jordan et al. .......... 718/103 |

OTHER PUBLICATIONS

Prosecution documents from related U.S. Appl. No. 12/573,635, 33 pages, Now U.S. Patent No. 8,195,909 Jun. 5, 2012.

* cited by examiner

*Primary Examiner* — Reginald Bragdon
*Assistant Examiner* — Mehdi Namazi
(74) *Attorney, Agent, or Firm* — Westman, Champlin & Kelly, P.A.

(57) ABSTRACT

An exemplary method includes receiving a command for storing data to a plurality of data storage resources, storing the data in a set of buffer storage locations, defining a plurality of jobs for the command, each of the plurality of jobs having an associated data operation with at least one of the data storage resources, and reallocating a subset of the buffer storage locations that stored the data for a completed job prior to completion of at least one other job.

20 Claims, 10 Drawing Sheets

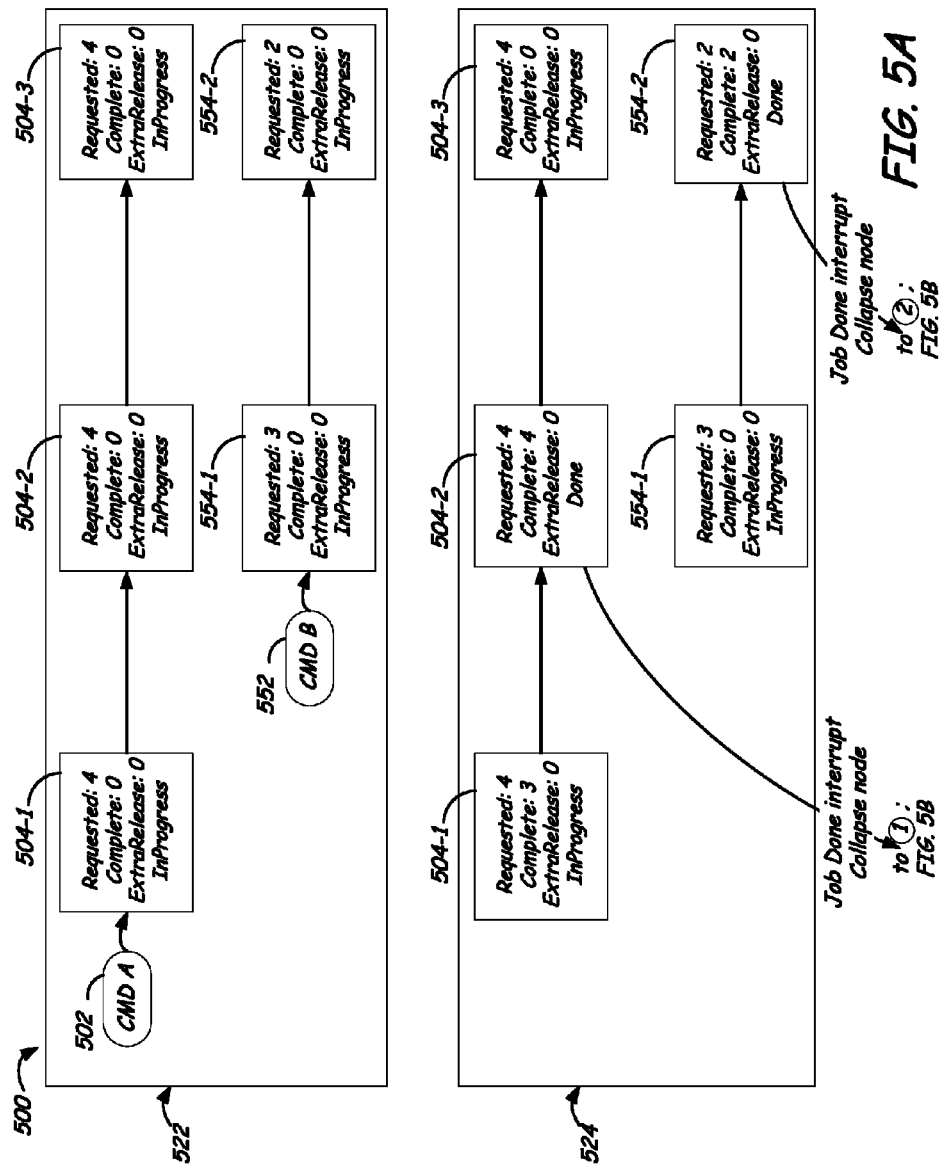

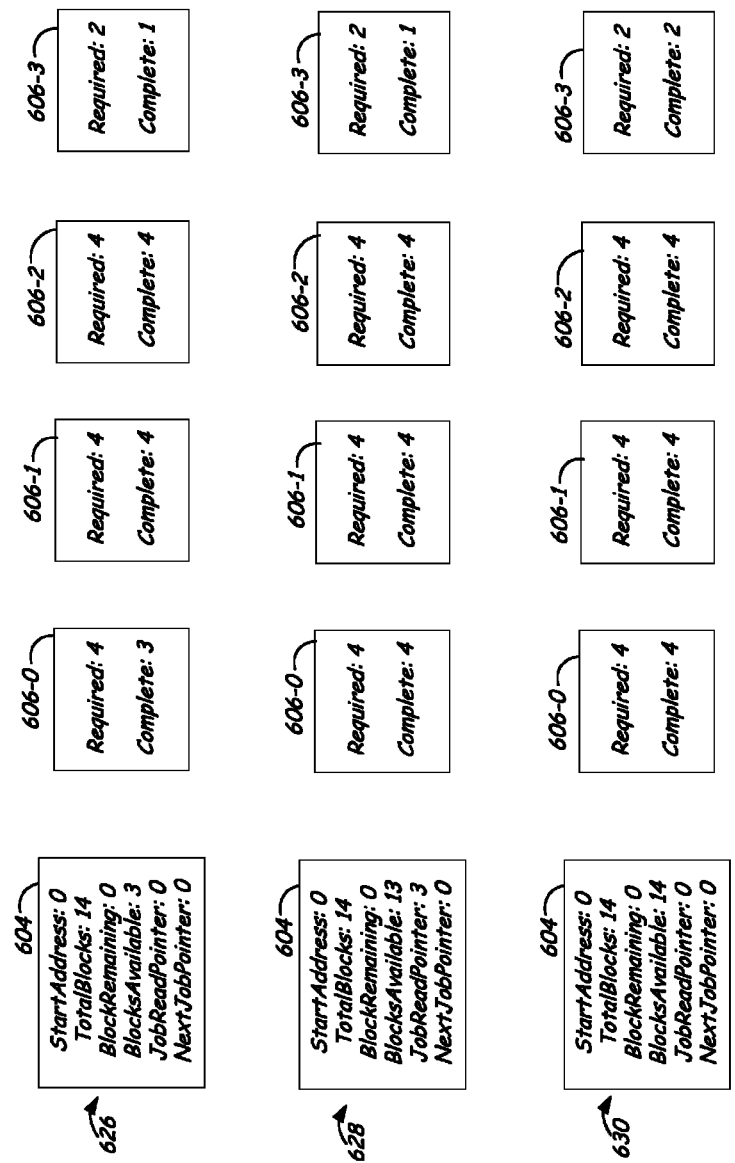

DATA MANAGEMENT IN A DATA STORAGE SYSTEM

CROSS-REFERENCE TO RELATED APPLICATION

The present application is a continuation of and claims priority of U.S. patent application Ser. No. 12/573,635, filed Oct. 5, 2009, the content of which is hereby incorporated by reference in its entirety.

BACKGROUND

A data storage system is an example of a system having data resources. For example, a data storage system includes one or more devices having at least one medium for data storage. The data storage system can include one or more types of storage mediums such as, but not limited to, hard discs, floppy discs, magnetic discs, optical discs, magnetic tapes, solid-state storage components, and/or combinations thereof. For instance, an exemplary data storage system can comprise a hard disc drive (HDD), a solid-state drive (SDD), a "hybrid" drive (e.g., a hybrid hard drive (HHD)), to name a few.

In one example, the data storage system includes a controller that is configured to receive data and commands from a host and implement data operations to the storage media in the data storage system based on the commands. The data storage system can include a plurality of devices and components having memory accessible by the controller. For instance, a solid-state drive (SDD) can include a plurality of data memory devices, such as flash memory chips, having solid-state memory accessible by a controller of the solid-state drive (SDD).

The discussion above is merely provided for general background information and is not intended to be used as an aid in determining the scope of the claimed subject matter.

SUMMARY

In one exemplary embodiment, a method includes receiving a command for storing data to a plurality of data storage resources, storing the data in a set of buffer storage locations, defining a plurality of jobs for the command, each of the plurality of jobs having an associated data operation with at least one of the data storage resources, and reallocating a subset of the buffer storage locations that stored the data for a completed job prior to completion of at least one other job.

In one exemplary embodiment, a data storage device includes a host interface configured to receive a data command, a plurality of data memory devices, and a buffer memory having storage locations configured to store data for the data command. A controller is configured to define a plurality of jobs for the data command, each of the plurality of jobs having an associated data operation with at least one of the data memory devices. The controller is configured to receive an indication that a particular one of the jobs has completed and reallocate storage locations of the buffer that stored the data for the completed job, prior to completion of the plurality of jobs.

In one exemplary embodiment, a controller for a data storage system includes a command interface configured to receive a data write command for a portion of data, a memory interface configured to communicate with a plurality of data storage resources, and a control circuit. The control circuit is configured to store the portion of data in a set of buffer storage locations of a buffer memory and define a plurality of jobs for the data write command. Each of the plurality of jobs has an associated data operation with one or more of the data storage resources. The control circuit is configured to reallocate a subset of the buffer storage locations that stored the data for a completed job prior to completion of at least one other job.

These and various other features and advantages will be apparent from a reading of the following detailed description.

BRIEF DESCRIPTION OF THE DRAWINGS

FIGS. 5A and 5B is a flow diagram illustrating a method for concurrent data management for multiple data commands.

FIGS. 7A and 7B is a flow diagram illustrating a method for concurrent data management using the exemplary data structure illustrated in FIG. 6.

DETAILED DESCRIPTION

Figure 1:
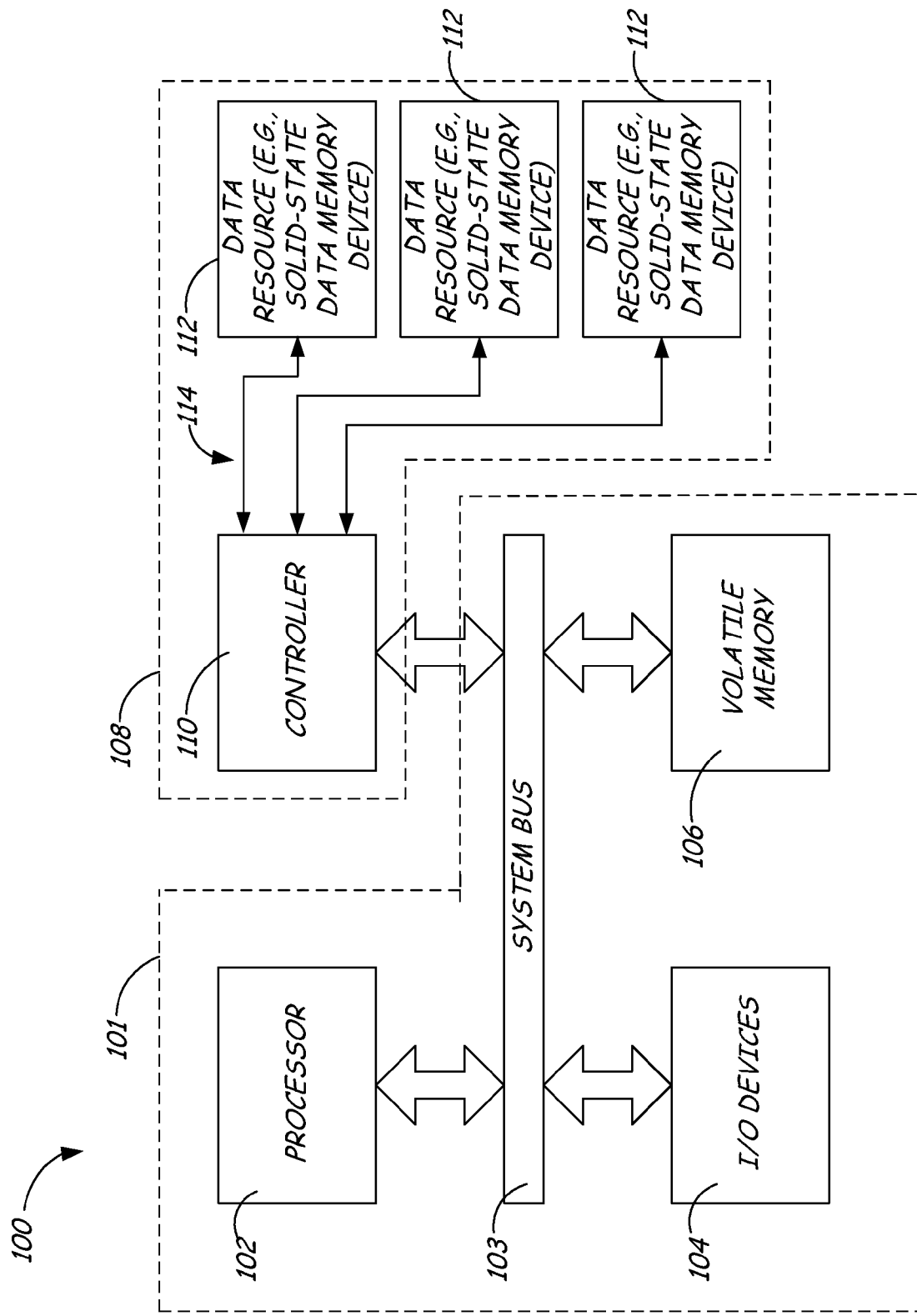
FIG. 1 is a schematic diagram illustrating an exemplary data storage system.

Aspects of the present disclosure relate generally to systems having concurrent data resources and more specifically, but not by limitation, to concurrent data management in a data storage system.

One aspect of data management in a data storage system, for example, generally relates to management of data flows from/to data resources, such as data storage media. For instance, data management can comprise tracking completion of data write operations to one or more data storage media. In another instance, for data read operations data management can comprise tracking data retrieved from one or more data storage resources and transferring the data to a host.

Data commands received from a host system or device, for example, can include constraints related to completion of the associated data operation(s). For example, for a read command, communication of read data from the data storage system to the host can require that the read data is transmitted to the host in an order and manner that is expected by and acceptable to the host. For instance, the order of data can be based on a function of logical block addresses of the data. In such cases, data management can comprise ensuring that the data is retrieved from the data storage devices and "throttled" to the host appropriately. The terms "throttled" or "throttling" refer to a process of ensuring that the data is retrieved from the data storage devices and transferred to the host in an order acceptable to the host. For example, in one embodiment data retrieved from the data storage devices is only transferred to the host when each respective part of the command is completely ready to be transferred to the host. The host may require that the data is received from the data storage system in an order based on the logical block addresses of the retrieved data.

In some data storage systems, data management is essentially "single-threaded" in that there is a single data resource (e.g., a read/write head) that can deliver data to/from a controller, buffer, cache, host interface, etc., at a time. On the other hand, some data storage systems include a plurality of data resources that are "concurrent" in that multiple data resources can be instructed to carry out data operations (or portions thereof) at substantially the same time and/or during overlapping time intervals. For instance, in a data storage system comprising an exemplary solid-state drive there can be tens to hundreds (or more) of concurrent data resources. For example, the solid-state drive can include a plurality of independent solid-state data memory devices (e.g., flash chips). Data commands (or portions thereof) can be provided from a drive controller to a number of the data memory devices concurrently. To illustrate, in one example the solid-state drive employs a mapping of host logical block addresses (LBAs) to physical locations. A set of LBAs for a single read command, for example, may be mapped to locations distributed across multiple data memory devices allowing the multiple data memory devices to service the single read command. Likewise, LBAs for multiple received read commands can also be mapped to locations distributed across the multiple data memory devices.

As mentioned above, the one or more read commands can include associated constraints (i.e., a host-expected data order) related to gathering of the read data from the data memory devices. In such cases, data management can comprise ensuring that the retrieved data is throttled to the host appropriately (i.e., held up until it can be delivered in the host-expected data order). However, retrieving the data from the data memory devices in-order can significantly limit performance of the data storage system.

In accordance with one aspect described herein, data management in a data storage system having a plurality of concurrent resources is provided. As used herein, the management of data across "concurrent" resources is referred to as concurrent data management. In one embodiment, concurrent data management enables data to be retrieved from the plurality of concurrent resources for one or more read operations, for example, in an order that is different (i.e., "out-of-order") than a data order defined for the read operation(s).

FIG. 1 is a schematic diagram of an exemplary data computing system 100 including a data storage system 108 having a plurality of concurrent data resources 112. As illustrated, a host system 101 includes a processor 102 connected to a system bus 103 which also can be connected to input/output (I/O) devices 104, such as a keyboard, monitor, modem, storage device, or pointing device. The system bus 103 is also coupled to a memory 106, which can include a random access volatile memory, such as dynamic random access memory (DRAM). The system bus 103 is also coupled to the data storage system 108 for communicating data and/or commands between data storage system 108 and host system 101.

Data storage system 108 includes a controller 110, which can be coupled to the processor 102 via a connection through the system bus 103. It is noted that in some systems this connection is made through one or more intermediary devices, such as a host bus adapter or a bridge.

Controller 110 communicates with the plurality of data resources 112 over one or more channels (i.e., buses) 114. In the illustrated embodiment, the data resources 112 comprise a plurality of data storage devices (illustratively, solid-state data memory devices). In one example, data storage system 108 comprises a solid-state drive and devices 112 comprise semi-conductor based devices, such as flash memory. In other embodiments, the data storage system 108 can also include volatile and/or non-solid-state memory. For example, data storage system 108 can comprise a disc drive and/or a "hybrid" drive including solid-state components and hard disc components.

Figure 2:
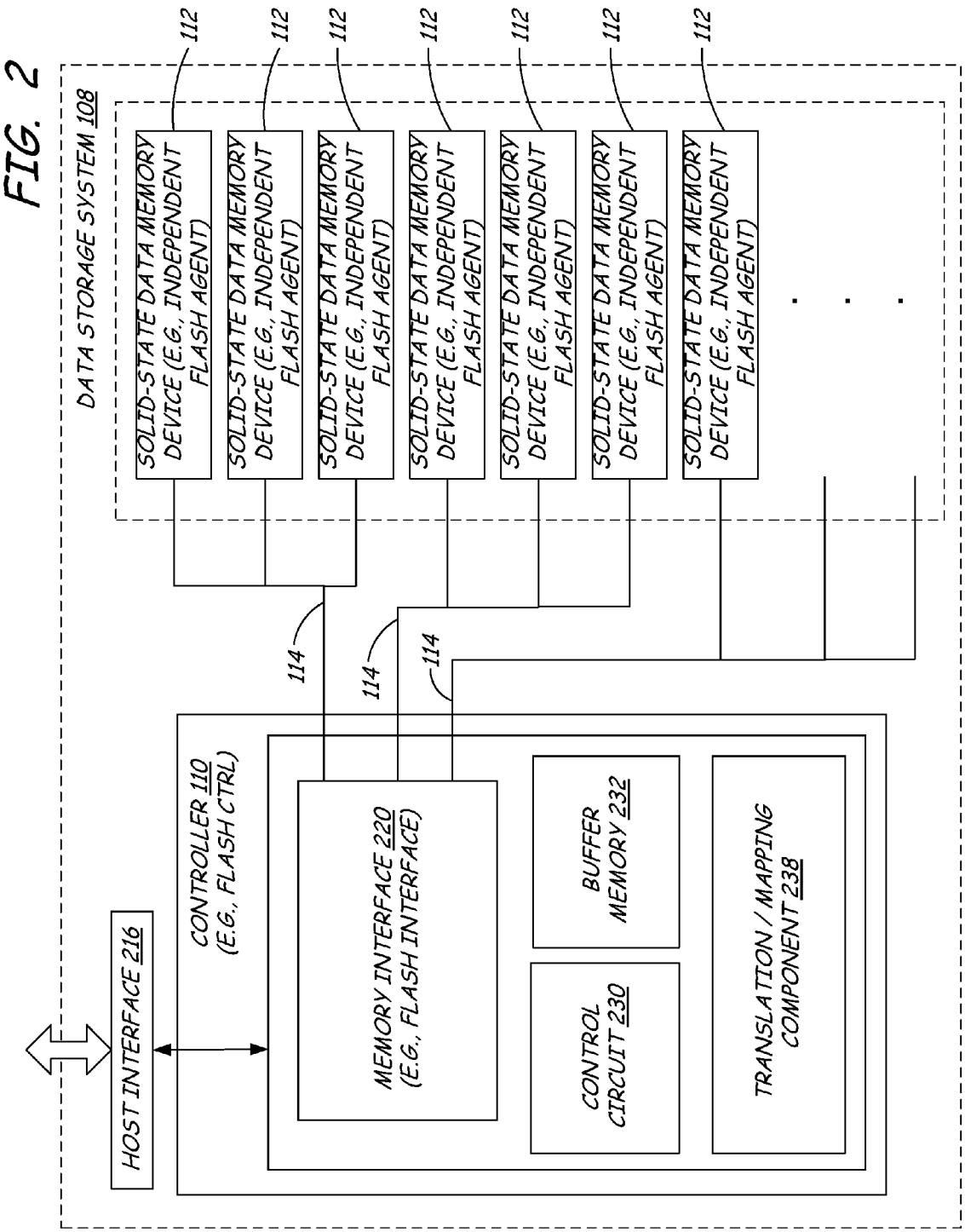
FIG. 2 is a schematic diagram illustrating one embodiment of the data storage system shown in FIG. 1.

FIG. 2 is a schematic diagram illustrating one embodiment of data storage system 108. Data storage system 108 includes controller 110 that is configured to store information to and retrieve information from the plurality of solid-state data memory devices (illustratively flash memory) 112.

In one embodiment, each of the devices 112 comprise an independent flash agent that is able to perform a data operation, or portion thereof, associated with a command received by the controller. For example, each flash agent 112 is configured to perform all, or a portion of, a data read, a data write operation, etc. Further, the data operation does not have to include a data transfer. For example, the data operation can include a data erase operation, such as an erase operation on a flash chip.

In one embodiment, each device 112 is identified by an assigned logical unit number (LUN). Each flash agent 112 can comprise one or more flash chips, for example. Alternatively, or in addition, one or more flash agents 112 can be provided on the same flash chip. In this manner, multiple logical storage units can be provided within a single die or package, for example. For instance, each flash agent 112 can include a separate flash chip comprising a semiconductor package having one or more semiconductor dice provided in a housing, for example.

Each device 112 can include an interface for communicating information with memory interface 220, control circuitry, and a storage area (having a particular capacity based on the design of the device components). For example, in one embodiment the storage area of one or more flash agent(s) 112 is capable of storing 1 mebibyte (MiB). In another embodiment, one or more flash agent(s) 112 are configured to store more than or less than 1 MiB.

However, it is noted that data memory devices 112 can have any suitable physical structure. For instance, each of data memory devices 112 can be provided on the same semiconductor die (e.g., the same piece of silicon). In another instance, one or more of data memory devices 112 are provided on different semiconductor die (e.g., different pieces of silicon). Further, it is noted that data storage system 108 can include any number of data memory devices 112. For example, in one embodiment data storage system 108 includes 4 to 256 data memory devices 112. However, less than 4 or more than 256 data memory devices 112 can be utilized.

Controller 110 includes memory interface 220 (illustratively a flash memory interface) that is coupled to the data memory devices 112 via one or more channels (i.e., busses) 114 for communicating commands and/or data. In one embodiment, channels 114 comprise 1 to 24 flash channels. However, any number of channels and/or connection topologies can be utilized. Channels 114 can comprise data busses, address busses, and/or chip select busses, for example.

While FIG. 2 illustrates a particular channel configuration, it is noted that the attachment methodology between the controller 110 and data memory devices 112 can be of any suitable form.

The controller 110 is communicatively coupled to a host, such as host system 101 illustrated in FIG. 1, via a host interface 216 that can receive and send commands, status information, and data to the host. The host interface 216 can pass commands to a control circuit 230 of controller 110 for processing and also store received data in a buffer memory 232. The buffer memory 232 provides the received data to the memory interface 220.

The memory interface 220 can receive data from the buffer memory 232 to be written to one or more of the data memory devices 112 and receive address bits from the control circuit 230. The memory interface 220 can assert corresponding data and address bits with appropriate timing and format to a selected data memory device 112. Memory interface 220 can also receive previously stored data from any storage locations (e.g., pages, blocks, etc.) of data memory devices 112.

In the flash memory example of FIG. 2, when a logical sector of data (i.e., a portion of data from host system 101 having an associated logical block address (LBA)) is to be written to memory 112, flash controller 110 identifies the physical address of the physical block to which the data will be written. The logical block address (LBA) is the address that the host system uses to read or write a block of data to data storage system 108. The physical block address is the fixed, physical address of a block in the storage component. In one example, the controller 110 can store a mapping of the logical addresses to the corresponding physical addresses in a translation/mapping component 238. The mapping information is utilized for data access operations to locate requested data in the memory devices 112. In another example, component 238 can operate as a cache for the mapping information. For instance, the mapping information can be stored to or otherwise associated with data memory devices 112. In this manner, the mapping information can be fetched from (on a read) or updated to (on a write) the solid-state data memory device(s) associated with the command.

Data memory devices 112 are independently addressable by controller 110. For example, controller 110 can issue commands (or portions thereof) and any associated data to/from each of two or more data resources 112 to be carried out during the same or overlapping time periods. In accordance with one embodiment, the controller 110 is configured to receive at least one command and decompose the at least one command into a plurality of subcommands or "jobs." A job can comprise a complete data operation for a command and/or can comprise a portion of an overall data operation for a command. For example, a single read or write command can be decomposed into a plurality of jobs to be performed by the data memory devices 112.

In one embodiment, the plurality of jobs are issued to a number of the data memory devices 112 in a parallel manner. For instance, an exemplary read command is decomposed into at least a first job and a second job. The first job pertains to a data access request for data stored in a first data memory device 112 and the second job pertains to a data access request for data stored in a second data memory device 112 that is different than the first data memory device 112. The first and second jobs are issued by the controller 110 to the first and second data memory devices 112, respectively, and are performed by the devices 112 during the same time period (or substantially the same time period) or during overlapping time periods, in one example. The number of jobs generated by the controller 110 for a command can be a function of, for example, the physical addresses of the data and the number of data memory devices 112 to be accessed for the particular command.

Controller 110 is also configured to concurrently manage completion information for each of the issued jobs and any data associated with the completed jobs. For example, for a read command controller 110 is configured to track a number of data blocks required for completion of each job and to track a number of data blocks that have been obtained for each job. Further, for a particular job controller 110 can also be configured to track a completion status of at least one other job in the plurality of jobs. For example, as discussed above a command (and the corresponding job decomposition) can have a defined or sequential order that is based on host requirements for the completion of the command (e.g., an order that the data is to be delivered to the host). Controller 110 is configured to concurrently manage the data memory devices 112 such that data can be received from the data memory devices 112 in the defined order and/or in an order that is different than the defined order.

Figure 3:
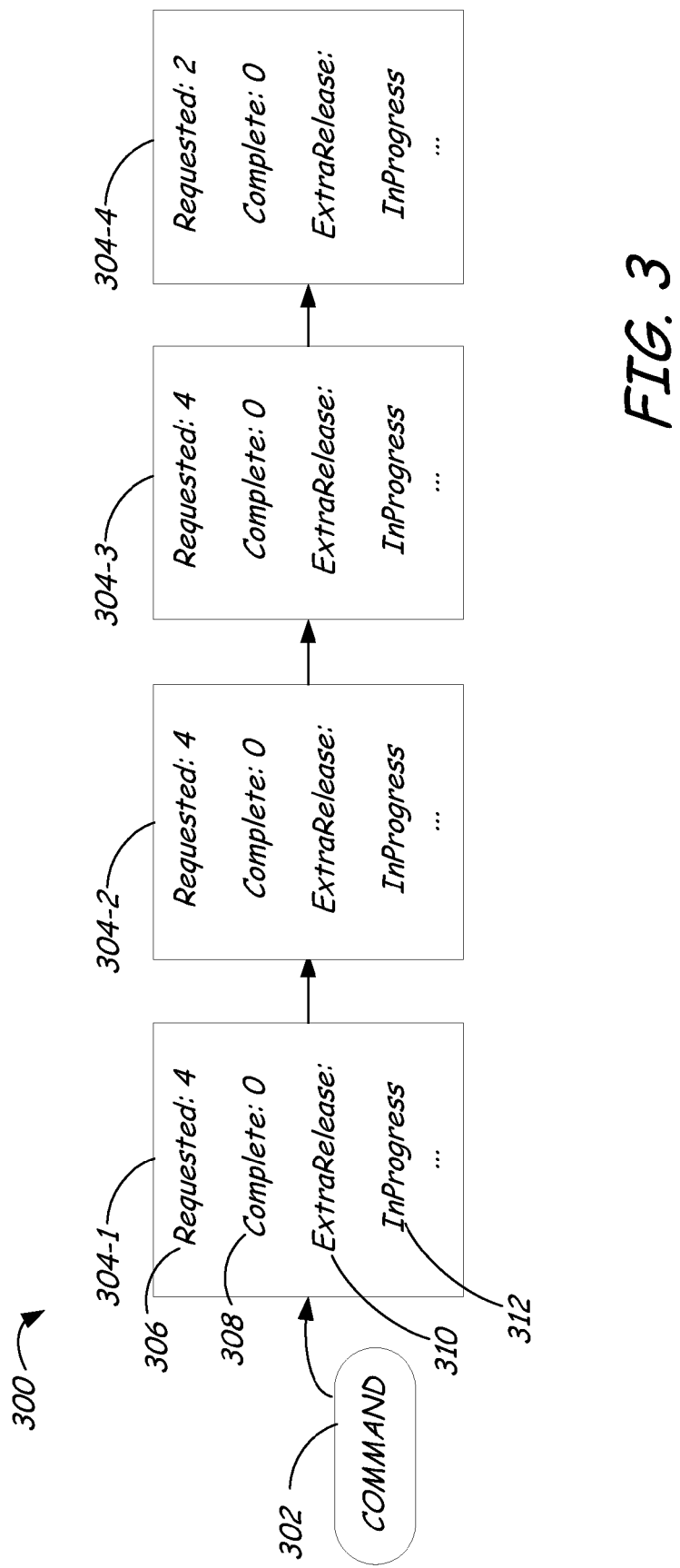
FIG. 3 is a diagram of a data structure representing an exemplary data command, under one embodiment.

To illustrate, FIG. 3 is a diagram of an exemplary data structure 300 that represents an exemplary command 302. While command 302 is illustrated as a single command, it is noted that command 302 can comprise multiple commands for data operations, such as read and/or write operations.

Data structure 300 can be implemented in hardware, software and/or firmware associated with controller 110. In one particular example, data structure 300 comprises one or more linked-lists implemented in firmware of controller 110.

The command 302 has been decomposed, for example by controller 110, into a plurality of jobs (illustratively four jobs). Data structure 300 includes a plurality of nodes 304-1, 304-2, 304-3, and 304-4 (collectively referred to as "nodes 304" or "jobs 304"). In the illustrated embodiment, each of nodes 304 corresponds to a data access request to a particular data memory device 112. For example, node 304-1 represents a first job comprising a data access request for a first portion of data stored in a first data memory device. Node 304-2 represents a second job comprising a data access request for a second portion of data stored in a second data memory device. Likewise, node 304-3 and 304-4 represent third and fourth jobs for command 302. As illustrated, command 302 requires a total of 14 blocks of data stored across multiple data storage devices 112. Further, it is noted that each of the jobs can pertain to data at different data storage devices 112 and/or a plurality of the jobs can pertain to data at the same data storage device 112.

Data structure 300 is illustratively a linked-list of job completion information, is utilized to manage completion of the jobs for command 302, and is stored in controller 110, for example. In one example, the jobs for command 302 have an order that is defined based on the command 302 and/or constraints on the subsequent transfer of data to the host. For example, in the illustrated embodiment the data for the first job (node 304-1) is to be released from the controller 110 to the host before (or at least with) the data for the second job (node 304-2). Similarly, the data for the second job is to be release before (or at least with) the data for the third job, etc.

The first node (e.g., node 304-1) in the data structure 300 is referred to as the "head" node. In accordance with one embodiment, the controller 110 is configured to release data to the host when the job represented by the "head" node completes. On the other hand, when a job represented by a "non-head" node completes, the controller 110 does not release the data to the host and instead stores the data (for example, in buffer memory 232) and indicates the stored data by modifying a preceding node in the data structure 300.

Data structure 300 can thus be utilized by controller 110 to manage completion of the jobs "out-of-order." For example, using data structure 300 controller 110 can receive and track data for the jobs in an order that is different than the order of the jobs illustrated in FIG. 3. For instance, controller 110 can receive and store the data for the second job (node 304-2) before the controller 110 receives any data for the first job (node 304-1). Subsequently, when the first job (node 304-1) completes (i.e., all the data for the first job is ready at the controller 110) the controller 110 can release the data for the first and second job to the host at the same (or substantially the same) time.

In the illustrated embodiment, each node 304 in the linked-list pertains to one of the jobs and can include fields such as, but not limited to, the following:

| | |
|---|---|
| 1) Requested | // Number of total data blocks in the job |
| 2) Complete | // A running total of the number of data blocks completed (i.e., received at the controller 110) for the job |
| 3) ExtraRelease | //Number of extra blocks (i.e., blocks in other jobs) to be released when the job is completed |
| 4) JobStatus | // Status of the job (i.e., InProgress, Done, Error, etc.) |
| 5) NextJob | // Pointer to the next job in the list |
| 6) JobInfo | // Additional information needed to complete the job |

In the context of FIG. 3, node 304-1 includes a "requested" field 306 that indicates the number of data blocks requested for the first job and includes a "complete" field 308 that indicates the number of data blocks that have been completed (i.e., received from the appropriate data storage device 112) for the first job. Fields 306 and 308 can also be recorded in units of LBAs, pages, bytes, etc. When controller 110 receives some or all of the data for the first job (node 304-1) from the data storage device 112, controller 110 can store the data (for example, in buffer memory 232) and adjust the "complete" field 308. Once all of the data for the job has been received, the job status flag 312 is changed to indicate that the job is done.

Node 304-1 also includes an "ExtraRelease" field 310 that represents data for at least one other job (nodes 304-2, 304-3, and/or 304-4). In accordance with one embodiment, the "ExtraRelease" field 310 indicates the number of blocks of data acquired for completed jobs. In one embodiment, the "ExtraRelease" field 310 for the first job (node 304-1) indicates the number of blocks of data acquired for completed jobs that are immediately after the first job (node 304-1) in the defined job order. In this manner, field 310 indicates the number of additional data blocks that are to be released with the data for the first job (node 304-1) when the first job also completes.

Further, each node 304 can also include additional fields such as, but not limited to, the number of sectors of data transferred to the host, the logical block addresses (LBAs) associated with the requested data, the physical block addresses associated with the requested data, etc.

Figure 4A:
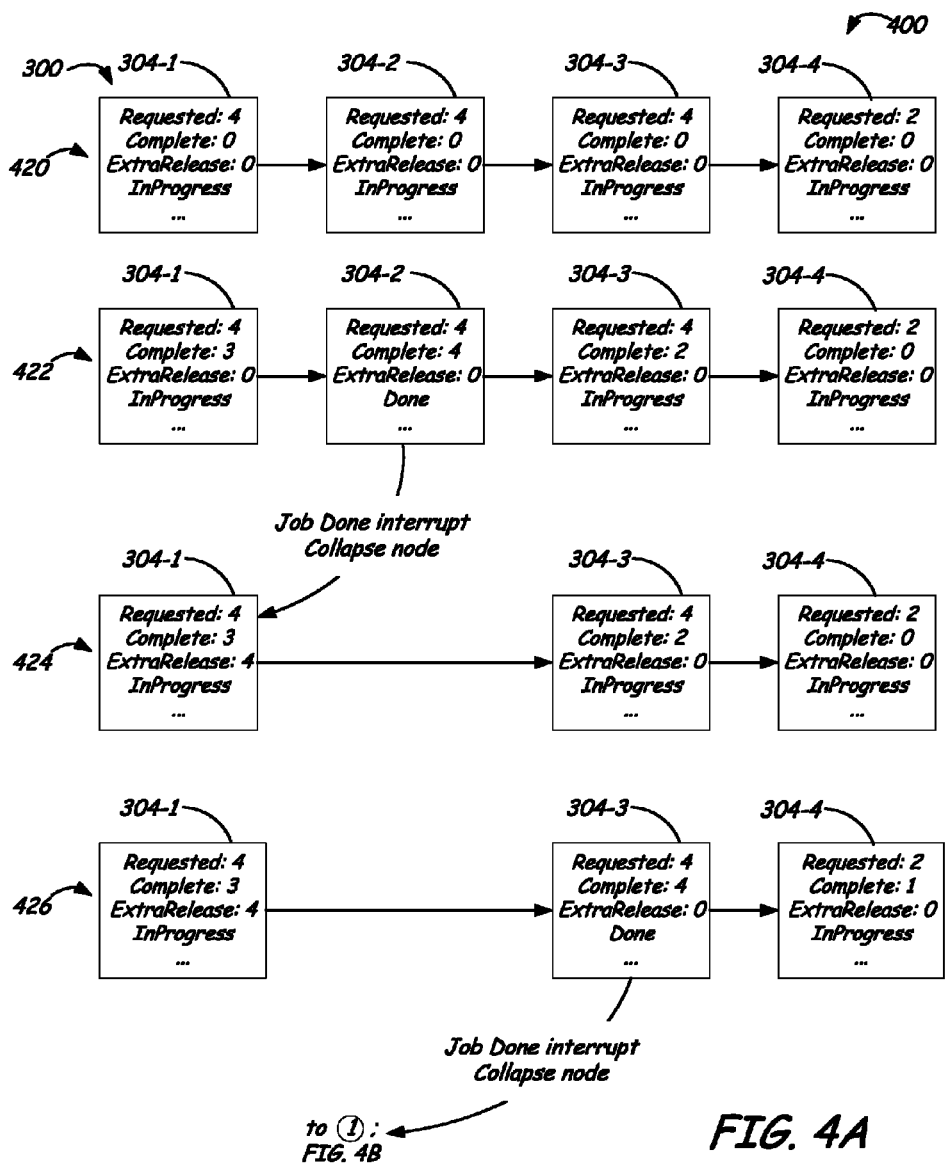
FIGS. 4A and 4B is a flow diagram illustrating a method for concurrent data management using the exemplary data structure illustrated in FIG. 3.
Figure 4B:
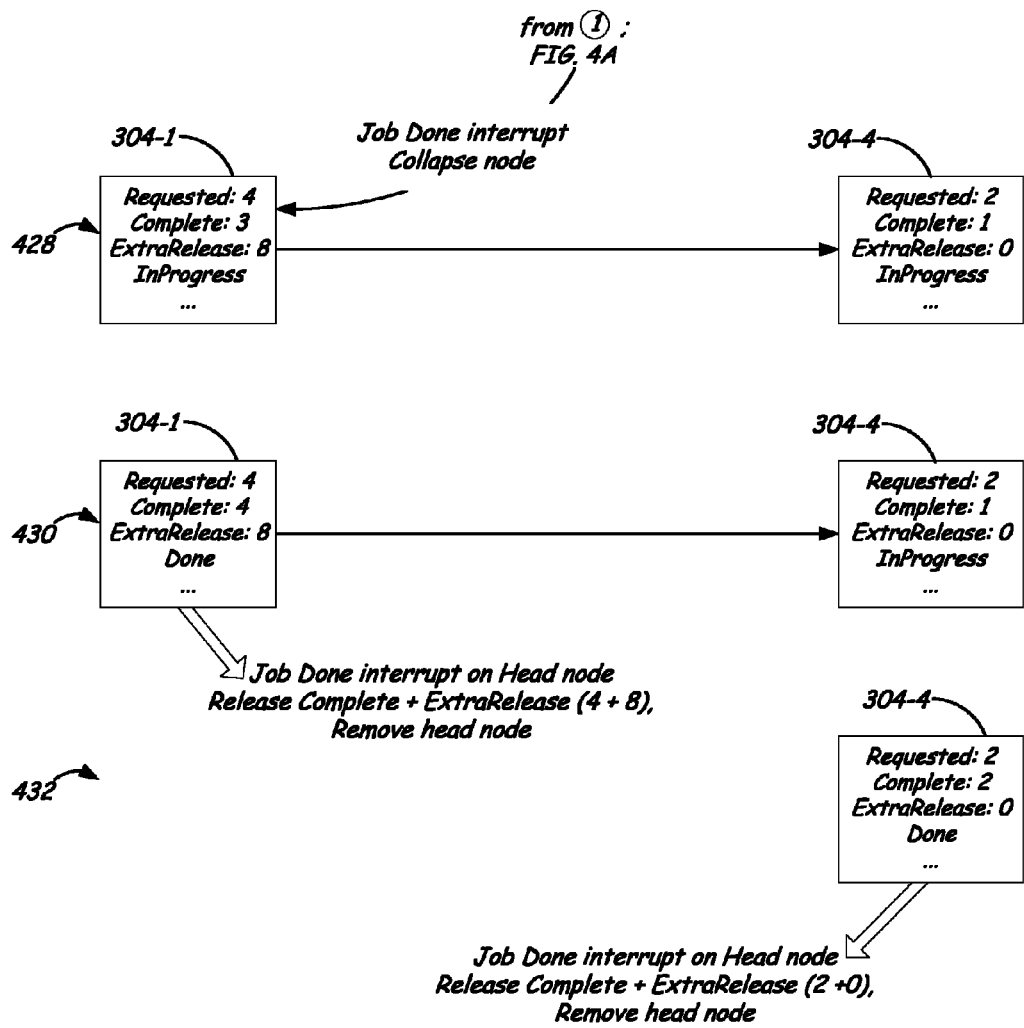

FIGS. 4A and 4B illustrate a flow diagram 400 of an exemplary method for concurrent data management using the exemplary data structure 300 illustrated in FIG. 3. In the context of FIGS. 4A and 4B, each row of nodes 304 illustrates a particular snapshot or instance in time. It is noted that snapshots 420-432 have been chosen to highlight the data structure 300 and are not intended to show every instance or data release opportunity.

At snapshot 420, the command has been decomposed into the plurality of jobs represented by nodes 304; however, data has not yet been received for any of the jobs. At snapshot 422, data for some of the jobs has been received from the data memory devices. For instance, three blocks of data of the four requested blocks have been obtained for the first job (node 304-1). Four blocks of data of the four requested blocks have been received for the second job (node 304-2). Two blocks of data of the four requested blocks have been received for the third job (node 304-3). No blocks of data have been obtained for the fourth job (node 304-4). Node 304-2 is modified to indicate that the second job has completed. The completed non-head node 304-2 can be removed or collapsed into the preceding node (head node 304-1). For instance, as can be seen at snapshot 424, the node 304-2 has been removed and the "ExtraRelease" field of node 304-1 has been changed to indicate the four blocks of data that were obtained for the completed second job (node 304-2).

At snapshot 426, all four data blocks for the third job (node 304-3) have been obtained. As illustrated in snapshot 428, node 304-3 is collapsed into the preceding node (in this instance the head node 304-1). The "ExtraRelease" field of node 304-1 is changed to indicate that the job for node 304-3 has also been completed.

At snapshot 430, all four of the requested blocks of data for the first job (node 304-1) have been received. Because node 304-1 comprises the head node, node 304-1 is removed and the data for the first job along with the data indicated in the "ExtraRelease" field (i.e., the data for the second and third jobs) is released (e.g., transferred from the data storage system to the host that issued the command) in an appropriate order.

At snapshot 432, only the fourth job (node 304-4) remains; node 304-4 comprises the head node. The data for the preceding jobs in the order have already been released to the host. At snapshot 432, the two requested blocks of data have been obtained for the fourth job (node 304-4). Because node 304-4 is now the head node, the data for the fourth job is also released (i.e., transmitted to the host) along with any data indicated in the "ExtraRelease" field. In this case, there is no extra data to release. Node 304-4 is removed.

Figure 5B:
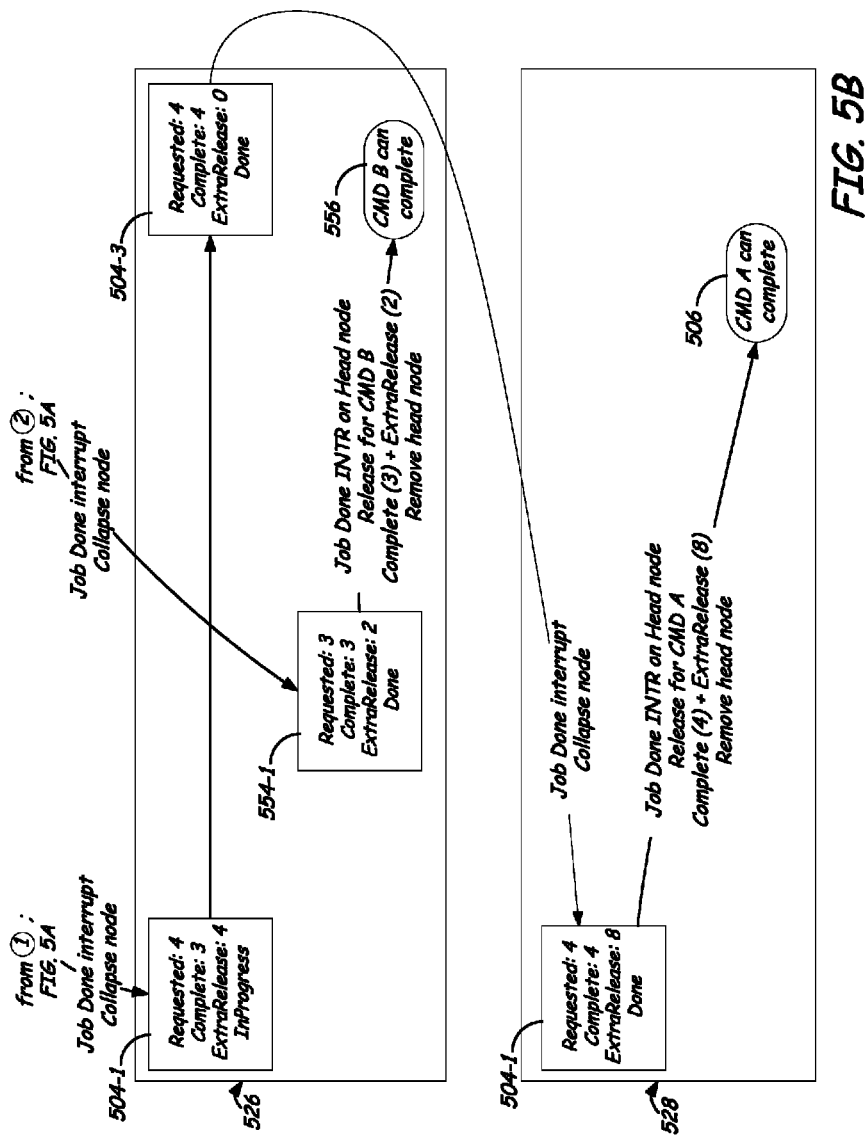

In the embodiment of FIGS. 4A and 4B, a single read command is illustrated. In accordance with another embodiment, a plurality of commands can be concurrently managed. FIGS. 5A and 5B illustrate a flow diagram 500 of an exemplary method for concurrent data management of multiple data commands.

Flow diagram 500 illustrates a first command 502 and a second command 552. In the context of FIGS. 5A and 54B, boxes 522, 524, 526, and 528 illustrate particular snapshots or instances in time. It is noted that snapshots 522, 524, 526, and 528 have been chosen to highlight the data structure and are not intended to show every instance or data release opportunity.

As illustrated at snapshot 522, command A 502 has been decomposed into a plurality of jobs represented by nodes 504-1, 504-2, and 504-3. Command B 552 has been decomposed into a plurality of jobs represented by nodes 554-1 and 554-2. It is noted that each of the jobs represented by nodes 504-1, 504-2, 504-3, 554-1, and 554-2 can comprises data access requests for different data memory devices. Alternatively, or in addition, two or more of the jobs can comprise data access requests to the same data memory device. For instance, the jobs represented by nodes 504-2 and 554-1 can be issued to the same data memory device.

At snapshot 524, the job represented by node 504-2 has completed and the node 504-2 is collapsed into the preceding node, in this case head node 504-1. Similarly, the job represented by node 554-2 has completed and the node 554-2 is collapsed into the preceding node, in this case head node 554-1.

At snapshot 526, the jobs represented by nodes 504-3 and 554-1 have completed. Because node 554-1 is the head node, the data blocks for the job represented by node 554-1 are released, along with the data indicated in the "ExtraRelease" field (in this case, the two blocks of data from node 554-2). At this point, command B 552 has completed and all the data for command B 552 has been transferred to the host. Because the data blocks for node 554-2 were already received and stored by the controller (and represented by the "ExtraRelease" field in node 554-1), the data storage system can transfer all of the data for the command without having to wait for the data to be acquired from the data storage devices for jobs 554-1 and 554-2 "in-order".

At snapshot 528, the job represented by node 504-1 has completed. Because node 504-1 is the head node, the data for job 504-1 is released along with the data indicated in the ExtraRelease field (in this case the data for nodes 504-2 and 504-3). Likewise, the controller 110 is not required to wait for the data for the subsequent nodes 504-2 and 504-3 to be transferred from the data memory devices as this data has already been transferred to the controller and is represented in the ExtraRelease field of the head node.

In one embodiment, although command A 502 arrived at the controller before command B 552, the data handling required by command A 502 causes command A 502 to take longer to complete than command B 552. Thus, although commands are received (e.g., enqueued) in a particular order, their order to "attach" to the host bus for data transfer can be different. This can allow for a more efficient transmittal of data as an earlier received command that takes a significant time to complete does not monopolize the host bus.

In accordance with one embodiment, one or more write commands are received by the controller and a plurality of jobs are generated for the write command(s). For the jobs generated for write command(s), the ExtraRelease field generally relates to the amount of buffer space that can be reallocated for other uses after the data for the job has been written to the appropriate data memory devices and the job has completed.

In some systems, the host bus protocol may not allow multiple connections for data transfers for a particular command. Thus, when a data transfer for a first command begins, all of the data for the first command must be transferred before a data transfer for a second command begins. In accordance with one embodiment, in the constrained case (where the host bus protocol does not allow multiple connections for a command) the controller is configured to connect the command to the bus for data transfer that is most likely to maximize the number releases of data per unit time until the end of the command. In one example, this is implemented by assuming that all commands are similarly sized, and attaching the command for data transfer whose data operation was started first on the back-end data storage resources. The system then gives preferential treatment to that command to limit or prevent the command from stalling the host bus, for example while the back-end data storage resources are accessed for the command. In another embodiment, a particular read command is not selected for attachment to the host bus for data transfer if the particular read command still requires more than one data transaction per back-end data storage resource to complete the read command.

In one embodiment, in the constrained case (where the host bus protocol does not allow multiple connections for a command, for example zero-buffer offset mode of first-party DMA in SATA) the queue entry for each command includes a pointer to the data structure (for example, data structure 300, 500) representing completion information for the command. The system hardware can utilize the pointer to keep track of the completion information for the command that is currently attached to the host bus and use the completion information to throttle transmission of data packets to the host. In one example, the system hardware uses the command completion information to throttle automatic transmission of data packet that must be equal to a maximum packet payload (e.g., 8 Kibibytes (KiB)) or the remainder of the host command, whichever is smaller.

In one embodiment, system firmware can pre-emptively make the selection of the command to connect to the host bus using the completion information (for example, if the firmware determines that a particular read command is not going to need more than a single data operation per back-end resource and that none of the resources are busy servicing other requests). In one example, the system firmware selects a command to connect to the host bus when the completion information for the command indicates that the head node of the linked-list associated with the command has completed.

In one embodiment, in the unconstrained case (where the host bus protocol allows multiple connections for a command), a command can be connected to the host bus for data transfer whenever a head node for a command completes and the "Complete" +"ExtraRelease" fields for the head node indicate an amount of data exceeding a threshold established by the firmware, or is equal to the remainder of the requested data blocks for the command, whichever is smaller.

In accordance with one embodiment, the data storage system is configured to prioritize read commands ahead of write commands. In this manner, the read commands may be easier to predict with respect to their readiness to attach to the host bus. The write operations can be utilized to fill in the host bus bandwidth between the read command data transfers, as available.

In one embodiment, the data storage system is configured to abort a write operation that is in progress if the abort is issued before the write operation has reached as particular point. For instance, to reduce read latency a write operation can be aborted in favor of a data read operation as long as the actual "program" flash command for the write operation has not been issued. However, this may cause some wasted processing or bus-transferring capacity on the back-end. Thus, in one embodiment a threshold can be tuned to adjust how far into the write operation an abort may be affected. In one example, the threshold is adaptively tuned based on the amount of write operations and/or read operations in the command queue. For instance, if there are a large number of write operations in the queue, but very few read operations, the controller can be configured to increase the read latency to more-preferentially process the write operations. This can be advantageous in situations where the host is waiting for write operation(s) to complete.

Figure 6:
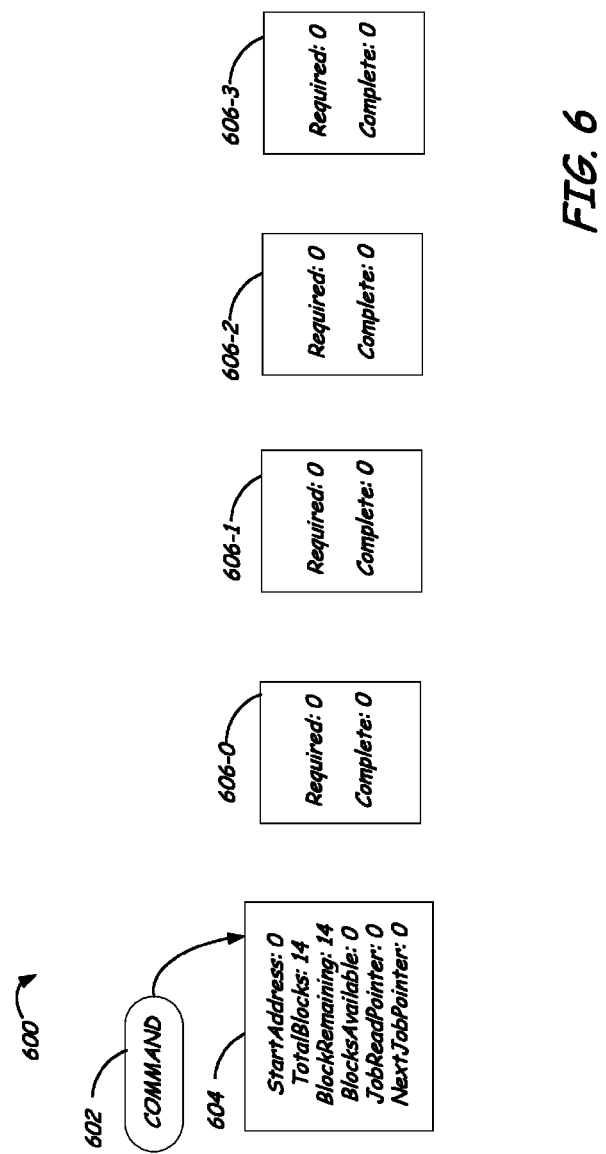
FIG. 6 is a diagram of a data structure representing an exemplary data command, under one embodiment.

FIG. 6 is a diagram illustrating another embodiment of a data structure 600 representing command completion information for an exemplary command 602. While command 602 is illustrated as a single command, it is noted that command 602 can comprise multiple commands for data operations, such as read and/or write operations.

Data structure 600 can be implemented in hardware, software, and/or firmware associated with controller 110, for example. In one particular embodiment, data structure 600 is implemented in hardware of controller 110 and includes a fixed number of entries for a predefined or maximum number of allowed jobs. The fixed number of entries of structure 600 relates to the number of jobs that can be outstanding and concurrently managed by controller 110 at a time. The number of entries of structure 600 can be based on constraints of the data storage system, such as the physical architecture of the controller, channels, and/or storage devices, for example.

To illustrate, in the embodiment of FIG. 6 data structure 600 includes a command descriptor 604 and a fixed number of available job descriptors 606 (illustratively four job descriptors 606). The command descriptor 604 is indicative of the overall command 602 while each job descriptor 606 is indicative of a particular job for the command 602. The number of available job descriptors 606 can be based on a number of hardware resources for carrying out data command 602 (e.g., a number of data memory devices 112, a number of channels 114, etc.). The number of jobs that can be concurrently managed by data structure 600 is, in one embodiment, equal to the number of available job descriptors 606. Additional jobs for the command (for example, when the number of total jobs for command 602 exceeds the number of available job descriptors 606) can re-use job descriptors 606 from completed jobs. This can be advantageous when the command 602 requires more jobs than can be tracked at one time with the available job descriptors 606.

While four job descriptors 606 are illustrated, it is noted that in other embodiments data structure 600 can include more than or less than four job descriptors 606. For example, data structure 600 can include tens, hundreds and/or thousands of job descriptors 606. Each one of job descriptors 606 is associated with (e.g., mapped to) a particular one of data memory device (e.g., logical unit number (LUN)). For instance, job descriptor 606-0 is associated with LUN 0, job descriptor 606-1 is associated with LUN 1, job descriptor 606-2 is associated with LUN 2, and so forth.

Upon reception of data command 602 that requires transfer to or from the data memory devices (e.g., data memory devices 112), the controller 110 generates the command descriptor 604. In the illustrated embodiment, the command descriptor 604 includes fields such as, but not limited to, the following:

| | |
|---|---|
| 1) StartAddress | // Address (e.g., LBA) associated with the start of the command |
| 2) TotalBlocks | // Number of blocks (e.g., sectors, 8-byte units, bytes, etc.) in the command |
| 3) BlocksRemaining | // Number of blocks remaining to be requested as jobs |
| 4) BlocksAvailable | // Number of blocks available from the head of the command (e.g., the head job descriptor node) |
| 5) JobReadPointer | // Pointer to oldest uncompleted job descriptor |
| 6) NextJobPointer | // Pointer to job descriptor to be filled in next |

The StartAddress and TotalBlocks fields are initialized based on the received command 602. The BlocksRemaining field is initialized to the same value as the TotalBlocks. The BlocksAvailable, JobReadPointer, and NextJobPointer fields are all initialized to zero. In the example illustrated in FIG. 6, command 602 includes a start address of LBA 0 and has a total number of requested blocks equal to 14.

Next, hardware and/or firmware of the controller 110, for example, perform mapping lookups sequentially through the transfer address range of command 602 to calculate the size in blocks of each required job. For instance, the controller 110 determines the number of jobs needed (and the number of required blocks for each job) to complete the command 602 based on the manner in which the data storage devices 112 need to be accessed for the command 602. In one example, the controller 110 decomposes the command 602 into a plurality of jobs based on the addresses of the data in the plurality of data storage devices 112. Each job descriptor 606 pertains to a particular logical unit number (LUN) for the job associated with that job descriptor 606.

As each job size is determined, the job descriptor 606 is initialized. The "Required" field of the job descriptor 606 is set to the size of the job (for example, the number of requested data blocks for the job) and the "Complete" field for the job descriptor 606 is initialized to 0. The "Complete" field indicates the amount of data (e.g., number of data blocks) that has been acquired by the data memory device for the job and/or has been transmitted from the data memory device to the controller 110. Data received by the controller 110 can be stored in a buffer or cache, for example.

FIGS. 7A and 7B illustrate a process of initializing the job descriptors 606 and utilizing the data structure 600 to concurrently manage the jobs issued to the data resources.

As illustrated at snapshot 620, controller 110 issues the first job (job 0) for the command 602 and initializes the job descriptor 606-0 for the first job (job 0). Because job 0 requires four blocks of data, the Required field of job descriptor 606-0 is set to 4. The Completed field of job descriptor 606-0 is initialized to 0 and the BlocksRemaining field of the command descriptor 604 is decreased by the size of the initialized job 0. The NextJobPointer field is incremented to indicate that job descriptor 606-1 is the next job descriptor to be filled in (i.e., job 1 is the next job to be issued). In one embodiment, when the NextJobPointer field of command descriptor 604 reaches the end of the available job descriptors 606, the NextJobPointer is wrapped to 0 to point to job descriptor 606-0. In this instance, all available job descriptors 606 have been initialized and the controller is configured to reuse job descriptors 606 for any additional jobs required for the command 602. The loading of the job descriptors 606 continues until the BlocksRemaining field of the command descriptor 604 reaches 0 or the NextJobPointer equals the JobReadPointer (all job descriptors 606 for the command are in use).

Once a job descriptor 606 is initialized, a media transfer associated with that job descriptor can be initiated. For example, at snapshot 620 the data transfer associated with job 0 can initiate even though other jobs for the command have not been issued.

At snapshot 622, the job descriptors 606-1, 606-2, and 606-3, associated with jobs 1, 2, and 3, respectively, have been initialized. Thus, all of the jobs have been issued and all of the command descriptors 606 have been initialized. However, no data blocks have been acquired for the jobs. The NextJobPointer of command descriptor 604 has been incremented to the next job pointer, in this case job 4. However, in the case where only four job descriptors are available, the NextJobPointer can be configured to wrap to the first job descriptor 606-0.

At snapshot 624, some of the data for the command has been acquired from the data memory devices. The data memory device associated with job 0 has acquired 3 blocks of data, the data memory device associated with job 1 has acquired 4 blocks of data, and the data memory device associated with job 2 has acquired 2 blocks of data. As the data is acquired, the data is transferred to the controller for storage, for example in a buffer, while additional data is obtained from the data memory devices. The job descriptors 606 are updated accordingly to reflect the number of acquired data blocks for the jobs. As illustrated at snapshot 624, the BlocksAvailable field of command descriptor 604 is updated to indicated that the 3 blocks of data have been acquired for the head job descriptor (in this case job 0). These 3 blocks of data can be transferred to the host at snapshot 624 or can be held until more data is acquired.

At snapshot 626, the jobs associated with job descriptors 606-1 (job 1) and 606-2 (job 2) have completed. In one embodiment, the data for jobs 1 and 2 is provided to the controller before the completion of job 0.

At snapshot 628, job 0 associated with the job descriptor 606-0 (which in this case is the head job descriptor) has completed as all 4 required data blocks have been acquired from the associated data memory device and provided to the controller 110. At this point, the BlocksAvailable field of the command descriptor 604 is updated to reflect that 13 blocks of data (4 blocks from job 0, 4 blocks from job 1, 4 blocks from job 2, and 1 block from job 3) have been acquired by the controller 110 and are available for transfer to the host, for example. In one embodiment, these 13 available blocks of data are "released" or transferred from the controller 110. Alternatively, the controller 110 can be configured to delay the data transfer to the host until the remaining data for the command has been acquired. At snapshot 628, the JobReadPointer field has also been updated to reflect that the next or oldest uncompleted job descriptor is now job descriptor 606-3.

At snapshot 630, the last block(s) of data for job descriptor 606-3 are acquired by controller 110 and the data is "released" from the controller 110. The JobReadPointer field is updated to reflect that job descriptor 606-3 has completed and to indicate the next uncompleted job descriptor (in this case the JobReadPointer wraps to 0).

In accordance with one embodiment, each job descriptor 606 is mapped to and associated with a particular data memory device having a particular logical unit number (LUN), for example. If the command(s) 602 do not comprise a job for one or more of the data memory devices, the corresponding job descriptors 606 for those data memory devices include a "next job" pointer. The "next job" pointer operates as a placeholder and instructs the controller to advance or skip that job descriptor. Alternatively, or in addition, the Required and Completed fields for the job descriptors that are not being used for the command(s) can be set to "0"'s to indicate that the job descriptors are not being used and should be skipped.

In accordance with one embodiment, the described data structures (e.g., data structures 300 and 600) enable tracking and management of jobs across a plurality of concurrent resources. In one aspect, one or more received commands are decomposed into a plurality of jobs, each job being indicative of a portion of the command(s). The jobs have an order that is defined based on, for example, the addresses of the data in the data storage devices. In one example, the order of the jobs is a function of a host-expected or host-acceptable order of the data. For instance, host protocol can require that the data for the jobs of the command are received by the host in the defined order. The data structure(s) are utilized by the controller 110 of the data storage system to concurrently manage the jobs such that the controller 110 can receive the data for the jobs in an order that different (e.g., out-of-order) than the defined order for the jobs. This can be advantageous as the controller 110 can acquire the data from the data memory devices as the data is made available at the data memory devices; the controller does not have to wait for the jobs to complete at the data memory devices in the defined order.

The implementations described above and other implementations are within the scope of the following claims.

What is claimed is:

1. A method comprising:
   receiving a command for storing data to a plurality of data storage resources;
   storing the data in a set of buffer storage locations;
   defining a plurality of jobs for the command, each of the plurality of jobs having an associated data operation with at least one of the data storage resources; and
   reallocating a subset of the buffer storage locations that stored the data for a completed job prior to completion of at least one other job.

2. The method of claim 1, wherein the command comprises a command for a first data write operation to the plurality of data storage resources, and wherein reallocating the subset of buffer storage locations comprises:
   reallocating the subset of buffer storage locations for a second data write operation prior to completion of the first data write operation.

3. The method of claim 2, wherein reallocating the subset of buffer storage locations comprises:
   storing at least a portion of data for the second data write operation in the reallocated buffer storage locations prior to completion of the plurality of jobs.

4. The method of claim 1, wherein the command comprises a command for a data write operation to the plurality of data storage resources, wherein reallocating the subset of buffer storage locations comprises:
   reallocating the subset of buffer storage locations for a read operation prior to completion of the data write operation.

5. The method of claim 1, the plurality of jobs having a defined job order that is a function of logical addresses of the data, wherein the buffer storage locations storing data for the plurality of jobs are reallocated in an order that is different than the defined job order.

6. The method of claim 1, wherein each job has a portion of data stored in the buffer, the method further comprising:
   issuing each job to a respective data storage resource with the portion of data stored in the buffer for the job.

7. The method of claim 6, further comprising:
   receiving information from the respective data storage resource upon completion of each job, the information indicating an amount of buffer space to be reallocated.

8. The method of claim 7, further comprising:
   transmitting the information to a host indicating the amount of buffer space to be reallocated.

9. The method of claim 1, wherein the plurality of data storage resources comprise a plurality of solid-state data memory devices.

10. The method of claim 1, and further comprising utilizing a data structure to concurrently manage each of the plurality of jobs.

11. The method of claim 10, wherein the data structure comprises a linked-list of completion information for the plurality of jobs, the linked-list comprising a plurality of nodes, each node of the plurality of nodes pertaining to one of the plurality of jobs.

12. The method of claim 11, wherein each job is represented by node data in a node of the linked-list, the node data for each job comprising:
   a first field indicative of a total number of data blocks in the job; and
   a second field indicative of a number data blocks written to the associated data storage resource for the job.

13. The method of claim 10, wherein the data structure comprises a command descriptor and a plurality of job descriptors, each job descriptor pertaining to one of the jobs and including information indicative of a total number of data blocks for the job, wherein the command descriptor includes data comprising:

a first field indicative of a number of data blocks for the command; and a second field indicative of a number of data blocks written to the data storage resources for the plurality of jobs.

14. A data storage device comprising:
a host interface configured to receive a data command;
a plurality of data memory devices;
a buffer memory having storage locations configured to store data for the data command; and
a controller configured to:
   define a plurality of jobs for the data command, each of the plurality of jobs having an associated data operation with at least one of the data memory devices;
   receive an indication that a particular one of the jobs has completed; and
   reallocate storage locations of the buffer that stored the data for the completed job, prior to completion of the plurality of jobs.

15. The data storage device of claim 14, wherein the data command comprises a first data write command and the storage locations that stored the data for the completed job are reallocated to store data for a second data write command.

16. The data storage device of claim 14, wherein the data command comprises a data write command and the storage locations that stored the data for the completed job are reallocated to store data for a read command, prior to completion of the plurality of jobs.

17. The data storage device of claim 14, wherein the data command comprises a data read command and the storage locations that stored the data for the completed job are reallocated to store data for a write command, prior to completion of the plurality of jobs.

18. A controller for a data storage system, the controller comprising:
a command interface configured to receive a data write command for a portion of data;
a memory interface configured to communicate with a plurality of data storage resources; and
a control circuit configured to:
   storing the portion of data in a set of buffer storage locations of a buffer memory;
   define a plurality of jobs for the data write command, each of the plurality of jobs having an associated data operation with one or more of the data storage resources; and
   reallocate a subset of the buffer storage locations that stored the data for a completed job prior to completion of at least one other job.

19. The controller of claim 18, wherein the controller is configured to store data for a second data write command in the reallocated subset of buffer storage locations.

20. The controller of claim 18, wherein the plurality of data storage resources comprise a plurality of solid-state data memory devices.

* * * * *

UNITED STATES PATENT AND TRADEMARK OFFICE
CERTIFICATE OF CORRECTION

PATENT NO.        : 8,443,165 B2                              Page 1 of 1
APPLICATION NO.   : 13/466397
DATED             : May 14, 2013
INVENTOR(S)       : Jonathan Williams Haines et al.

It is certified that error appears in the above-identified patent and that said Letters Patent is hereby corrected as shown below:

In the Claims

In column 14:

in line 59, insert --of-- before "data blocks"

Signed and Sealed this
Twenty-sixth Day of November, 2013

Margaret A. Focarino
*Commissioner for Patents of the United States Patent and Trademark Office*